United States Patent Office 3,538,086
Patented Nov. 3, 1970

3,538,086
4-OXO-4H-PYRIMIDO 2,1-b BENZOTHIAZOLES
Mohan Damodaran Mair and Thomas George, Goregaon, Bombay, India, assignors to Ciba Limited, Basel, Switzerland, a company of Switzerland
No Drawing. Filed Nov. 21, 1967, Ser. No. 684,624
Claims priority, application Switzerland, Nov. 29, 1966, 17,082/66; Oct. 19, 1967, 14,629/67
Int. Cl. A61k 27/00; C07d 91/52
U.S. Cl. 260—239.75        9 Claims

ABSTRACT OF THE DISCLOSURE

Benzheterocyclic compounds having the ring system of the formula:

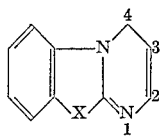

X=oxygen or sulfur, these compounds being substituted in 3-position by a free or functionally converted carboxyl or an acyl group and in 4-position by an oxo, thiono or imino group, their oxides and salts of such compounds have pharmacological, particularly antiviral effects.

SUMMARY OF THE INVENTION

The present invention concerns and has for its object the provision of benzheterocyclic compounds having the nucleus of the formula:

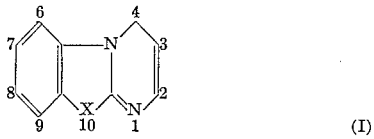

wherein X represents an oxygen or, preferably, a sulfur atom, which compounds carry in the 3-position a free or functionally converted carboxyl group or an acyl group and in the 4-position an oxo, thiono or imino group, as well as their oxides and salts of such compounds, compositions, particularly pharmaceutical compositions containing them and process for their manufacture. The compounds are useful as pharmacological, particularly antiviral agents.

DESCRIPTION OF THE PREFERRED EMBODIMENTS

A functionally converted carboxy group is, for example, a cyano group, or a carbamoyl or hydrazinocarbonyl group, in which the nitrogen atoms may optionally be mono- or poly-, e.g. disubstituted, for example, by lower alkyl, e.g. methyl or ethyl groups, more particularly, however, an esterified carboxyl group, especially a carbo-lower alkoxy, e.g. carbomethoxy or carboethoxy group. An acyl group is, for example, an alkanoyl group, particularly a lower alkanoyl, especially an acetyl, as well as a formyl, propionyl or n-butyryl group.

The new compounds may also carry further substituents. Thus, they may carry, for example, in 2-position an aliphatic residue, especially a lower aliphatic hydrocarbon radical, such as a lower alkyl, e.g. methyl, ethyl, n-propyl, isopropyl, n-butyl or isobutyl group, or a lower alkenyl, e.g. allyl or methallyl group, or a cycloaliphatic hydrocarbon radical, such as a cycloalkyl or cycloalkyl-lower alkyl group having from 3 to 8, preferably 5 to 6 ring carbon atoms, such as a cyclopentyl, cyclohexyl, cyclopentylmethyl or cyclohexylmethyl group. The substituent in the 2-position may also be an aromatic, e.g. phenyl, or an araliphatic, such as a phenyl-lower alkyl, e.g. benzyl group, in which the aromatic portion may carry substituents, such as lower alkyl groups, lower alkoxy, e.g. methoxy, ethoxy or propyloxy groups, halogen, e.g. fluorine, chlorine or bromine atoms, trifluoromethyl groups or nitro groups.

The aromatic portion of the molecule may be unsubstituted or substituted by one or more than one of the same or different substituents attached to any of the positions available for substitution. Substituents are, for example, lower alkyl, such as the groups defined above, lower alkenyl, such as the groups defined above, lower alkoxy groups, such as those defined above, lower alkylenedioxy, e.g. methylenedioxy groups, aryloxy, e.g. phenyloxy groups, aryl-lower alkoxy, such as phenyl-lower alkoxy, e.g. benzyloxy groups, lower alkyl-mercapto, e.g. methyl-mercapto groups, halogen atoms, such as those mentioned above, trifluoromethyl groups, nitro groups, free or substituted amino, such as amino, lower alkyl-amino, e.g. methylamino, ethylamino or isopropylamino, di-lower alkylamino, e.g. dimethylamino or diethylamino, acylamino, such as lower alkanoyl-amino, e.g. acetylamino groups, or carbamoylamino or thiocarbamoylamino, such as N-unsubstituted or N-substituted, e.g. N-phenyl- or N-lower alkylsubstituted carbamoylamino or thiocarbamoyl amino groups, or sulfonylamino, such as phenyl-sulfonylamino groups, free or functionally converted carboxyl groups as defined before, free or functionally converted sulfo, such as sulfamoyl groups, or aryl or aryl-lower alkyl, e.g. phenyl, benzyl or phenyl-ethyl groups, or bivalent aliphatic, such as bivalent aliphatic hydrocarbon residues, advantageously substituting neighbouring carbon atoms of the aromatic portion of the molecule, such as lower alkylene residues having preferably four carbon atoms, e.g. the 1,4-butylene group, or a lower alkenylene residue having preferably four carbon atoms, e.g. the 1- or 2-buten-1,4-ylene or, preferably, the 1,3-butadien-1,4-ylene group; said residues, particularly the aryl e.g. phenyl residue, or the bivalent residues, particularly a 1,3-butadien-1,4-ylene residue, may also be substituted in the mainner indicated above.

The oxides mentioned above are N-oxides or, when X is a sulfur atom, sulfoxides and, above all, sulfones.

The new compounds of this invention possess valuable pharmacological properties. Apart from antifungal activities, especially against Trichophyton species, they show antirival activity, e.g. against Sindbis virus, as can be demonstrated by tests carried out on laboratory animals, such as hamsters, and primarily antiinfluenza activity, particularly of prophylactic nature, e.g. against influenza PR₈ virus, as can be demonstrated by tests using laboratory animals, such as mice, when administered by subcutaneous or oral routes. They are, therefore, useful pharmacologically, particularly as antiviral agents, which are applicable prior or after infection. Furthermore, they are useful as intermediates for the preparation of other useful products, particularly of pharmacologically active compounds .

Particularly valuable with respect to their antiviral, such as anti-influenza properties, are compounds of the formula:

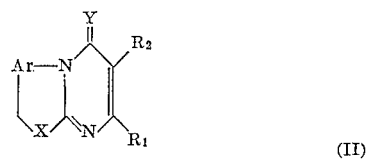

wherein $R_1$ is an aliphatic or cycloaliphatic hydrocarbon residue, or an aryl radical, especially a lower alkyl, e.g. methyl, ethyl or propyl radical, or, above all a hydrogen atom, $R_2$ is a free carboxyl group, carbamoyl, hydrazinocarbonyl or cyano group, or, primarily, a carbo-lower alkoxy group, as well as a lower alkanoyl group, especially an acetyl group, and Y is a sulfur atom or an imino group or, especially, an oxygen atom, X stands for oxygen, or preferably, sulfur, and Ar is an at most bicyclic o-arylene radical, especially a 1,2-phenylene, as well as 1,2-naphthylene group optionally carrying one or more of the substituents defined before, or the salts thereof.

Especially useful with respect to their antiviral, such as anti-influenzy properties are compounds of the Formulae III*a* and III*b*:

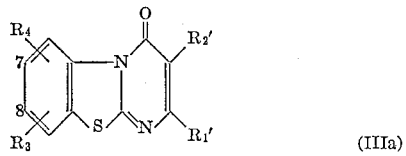

and

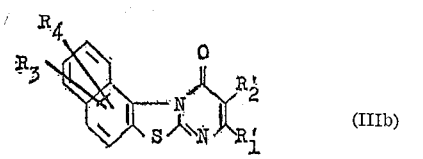

wherein $R_1'$ is a lower alkyl radical or, preferably, a hydrogen atom, $R_2'$ is a lower alkanoyl group or a cyano group, or preferably, a free carboxyl group or a carbo-lower alkoxy group, each of the groups $R_3$ and $R_4$ stands for a hydrogen atom or one of the substituents mentioned above, especially a lower alkyl, e.g. methyl, ethyl, n-propyl group, a lower alkoxy, e.g. methoxy and ethoxy group, a halogen, e.g. fluorine, chlorine or bromine atom, a trifluoromethyl group, a nitro group, or free or substituted amino group, such as an N-mono-lower alkyl- or N,N-di-lower alkyl-amino group, an N-acylamino, such as an N-lower alkanoyl-amino group, an N-carbamoylamino or N-sulfonylamino group, such as an N-phenylsulfonylamino group, for example, one of the groups mentioned above, or salts of such compounds.

Above all the present invention concerns compounds of the Formulae IV*a* and IV*b*

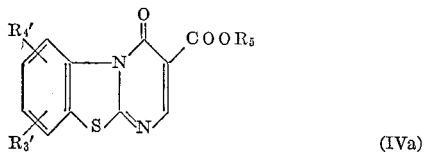

and

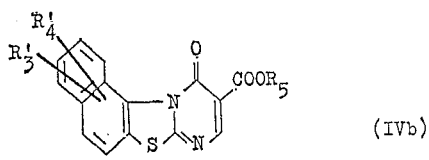

wherein each of the groups $R_3'$ and $R_4'$ stands for a hydrogen atom, a lower alkyl, particularly methyl group, a lower alkoxy group, a nitro group, a halogen, e.g. chlorine, bromine, or fluorine atom, a trifluoromethyl group, a free or substituted amino group, such as a mono- or di-lower alkyl-amino, e.g. methylamino or diethylamino group, an acylamino group, such as a lower alkanoylamino, e.g. acetylamino group, a phenyl-sulfonylamino or an N'-unsubstituted or N'-substituted, such as an N'phenyl- or N'-lower alkyl substituted carbamoylamino group, whereby, for example, in compounds of the Formula IV*a*, the groups $R_3'$ and $R_4'$ may occupy the 8- and the 7-position, respectively, and $R_3'$ represents a hydrogen atom, a lower alkyl group or a lower alkoxy group and $R_4'$ has, with the exception of lower alkoxy, the above given meaning, and R- stands for a hydrogen atom or a lower alkyl, e.g. methyl, ethyl or propyl group, or salts thereof; these compounds show outstanding antiviral, particularly anti-influenza properties.

Especially valuable in view of their potent antiviral effects, particularly anti-influenza activity against $PR_8$ virus, as can be demonstrated by experiments carried out on experimental animals, such as mice, are the 3-carboxy-7-nitro-4-oxo-4 - H - pyrimido[2,1-b]benzthiazole, or its lower alkyl, e.g. methyl or ethyl esters, or alkali metal salts thereof, the 7 - N - (4-acetylamino-phenylsulfonyl)-amino-3-carbethoxy-4-oxo-4H - pyrimido[2,1-b] benzthiazole, the 3-carbethoxy-7-N-(3-chloro-phenylcarbamoyl)-amino-4-oxo-4H-pyrimido[2,1-b] benzthiazole, or the 8-ethoxy-3-carbethoxy-4-oxo-4H - pyrimido[2,1-b] benzthiazole, as well as the 3-carboxy-8-methyl-4-oxo-4H-pyrimido[2,1-b]benzthiazole or its alkali metal salts, and, furthermore, the 10 - carbethoxy-11-oxo-11H-naphtho[1', 2': 4,5]thiazole[3,2-a]pyrimidine or acid addition salt of such compounds; these compounds, when administered subcutaneously or orally at a daily dose of about 0.05 to about 0.2 g./kg., produce excellent antiviral effects.

The new compounds are prepared by methods in themselves known, for example, by (a) cyclizing a benzheterocyclic compound having the nucleus of the Formula V:

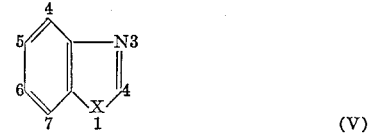

in which compounds the 2-position is substituted by an ethenyl-amino group, the β-carbonatom of which carries as substituents a reactive functionally converted carboxyl group and a functionally converted carboxyl group or an acyl group, or a tautomer thereof, or (b) cyclizing a compound having the ring system of the formula:

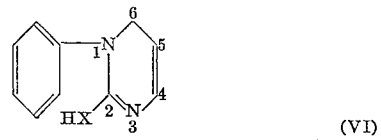

in which at least one of the ortho-positions of the carbocyclic nucleus is unsubstituted, and which contain in 5-position of the heterocyclic ring a free or functionally converted carboxyl group or an acyl group and in 6-position an oxo, thiono or imino group.

A reactive functionally converted carboxyl groups is group of the formula $-C(=Y_1)-Y_2$, wherein $Y_1$ is an oxygen atom, and $Y_2$ is a group capable of reaction with a secondary amine under elimination of the elements of an alcohol, an acid or a thiol, for example, a lower alkoxy, e.g. methoxy or ethoxy group, a lower alkyl-mercapto, e.g. methylmercapto group, an esterified hydroxy group, such as a halogen, e.g. chlorine or bromine atom, or a hydroxyl group esterified by a carboxylic acid, such as a lower alkanoyloxy, e.g. an acetyloxy group, or by a sulfonic acid, e.g. a benzene sulfonyloxy group, or wherein $Y_1$ and $Y_2$ together form an $\equiv N-$ grouping.

The cyclization is preferably carried out while heating, if desired, in the presence or absence of a suitable diluent and/or with the aid of reagents capable of acting as condensing agents, such as acetic acid anhydride, phosphorous oxychloride, concentrated sulfuric or hydrochloric acid, or polyphosphoric acid, if necessary, in a closed venel and/or in the atmosphere of an inert gas, e.g. nitrogen.

Ring-closure of starting materials with the ring system of the Formula VI is carried out in a per se known manner, for example according to the Hugenschoff method, e.g. by treatment with halogen, particularly with bromide, as well as chlorine, or with a sulfur-halogen containing condensing reagent, particularly with sulfuryl chloride, as well as sulfur monochloride, preferably in the presence of a suitable solvent, e.g. chloroform, ethylene dichloride, chlorobenzene, nitrobenzene or acetic acid, if necessary, while cooling or treating and/or in the atmosphere of an inert gas.

In resulting compounds and in accordance with the scope of the final products, substituents may be introduced, removed and/or converted. Thus, a functionally converted carboxyl group may be converted by known methods into a free or into another functionally converted carboxyl group, for example, by hydrolysis (an esterified carboxyl group, for example, by treatment with a basic or acidic reagent), alcoholysis or transesterification (if necessary, in the presence of a transesterification reagent, such as an alkali metal alcoholate), as well as amidation (an esterified carboxyl group or a chlorocarbonyl group, for example, by treatment with ammonia or an amine), or treatment with a hydrazine (an esterified carboxyl group, for example, by treatment with hydrazine or hydrazine hydrate). A free carboxyl group may be converted into a functionally converted carboxyl group, for example, into an esterified carboxyl group by esterification (such as treatment with an alcohol in the presence of a catalyst, such as an acid, or with a diazo compound) or into a carbamoyl or cyano group by dehydration of an ammonium salt. An imino group may be converted hydrolytically into an oxo group, e.g. by treatment with an aqueous acid, such as dilute hydrochloric acid. Furthermore, an oxo group may be converted into a thiono group by treatment with a sulfur-introducing reagent, such as phorphorous pentasulphide.

Furthermore, resulting benzheterocyclic compounds can be nitrated using conventional methods, such as treatment with a mixture of concentrated or fuming nitric acid and concentrated sulfuric acid, to yield compounds nitrated in the aromatic portion, particularly mononitro or dinitro derivatives; thus, nitration of 3-carbethoxy-4-oxo-4H-pyrimido[2,1-b]benzthiazole yields the 3-carbethoxy-7-nitro-4-oxo-4H-pyrimido[2,1-b]benzthiazole.

In nitro substituted compounds a nitro group may be reduced by treatment with suitable reducing agents to an amino group, e.g. by treatment with metal—said combinations, or with hydrogen in the presence of suitable catalysts, such as nickel, platinum or palladium catalysts, or by any other process known for the reduction of such nitro groups; thus, reduction of 3-carbethoxy-7-nitro-4-oxo-4H-pyrimido[2,1-b]benzthiazole with hydrogen in the presence of a platinum oxide catalyst yields the 7-amino-3-carbethoxy-4-oxo-4H-pyrimido[2,1-b]benzthiazole.

Amino compounds may be substituted, such as lower alkylated, to yield mono- or disubstituted amino, such as mono- or di-lower alkyl-amino groups; thus, amino compounds may be treated with reactive esters of alcohols, such as esters of alcohols and hydrohalic acids or organic sulfonic acids, or with compounds containing carbonyl groups, such as aldehydes, e.g. benzaldehydes, or substituted benzaldehydes, as well as ketones to form Schiff's bases, which may be reduced, e.g. by treatment with a suitable hydride reducing reagent, such as sodium borohydride, or with catalytically activated hydrogen. Furthermore, amino groups may be acylated, e.g. by treatment with reactive functionally converted carboxylic or sulfonic acids, such as halides, anhydrides or esters thereof. As acid anhydrides are also considered the inner anhydrides of carbamic or thiocarbamic acids, i.e. isocyanates or isothiocyanates, such as lower alkyl-, aryl-, and aryl-lower alkyl isocyanates and isothiocyanates, for example, lower alkyl isocyanates, e.g. methyl, ethyl, propyl or butyl isocyanates, phenyl and substituted, especially lower alkyl- or halogeno-substituted phenyl isocyanates, or benzyl isocyanate; acylation of amino compounds with such reagents yield the corresponding urea or thiourea derivatives.

By treatment with oxidation reagents, e.g. hydrogen peroxide or per-acids, e.g. per-carboxylic or persulfonic acids, according to known methods, preferably in the presence of suitable diluents, compounds of this invention may be converted into their oxides.

The starting materials may be prepared by methods which are in themselves known. Thus, starting materials having the ring system of the Formula V may be obtained, for example, by reacting a benzheterocyclic compound containing the nucleus of the above Formula V, wherein X stands for an oxygen or preferably a sulfur atom, which contains in the 2-position a primary amino group, or a tautomer thereof, with a carbonyl compound, substituted at the carbonyl carbon by a methyl group which carries a reactive functionally converted carboxyl group and a functionally converted carboxyl group or an acyl group, or with an enol derivative thereof, or with a reactive functionally converted carboxylic acid and a functionally converted acetic acid, substituted by a functionally converted carboxyl group or an acyl group, or by reacting an N'-substituted N-Z-carboxamidine compound, in which Z represents a residue containing the ring system of the Formula V, bound through its 2-position to the nitrogen atom of the carboxamidino group, with a functionally converted acetic acid, substituted by a functionally converted carboxyl group or an acyl group.

Enol derivatives are, particularly enol ethers, primarily enol ethers containing lower alkyl, especially methyl, as well as aryl-lower alkyl, such as phenyl-lower alkyl, e.g. benzyl groups. Thus, for example, compounds having the ring system of the Formula V and an amino group in 2-position may be reacted with a lower alkoxymethylene-malonic ester, -cyanoacetic ester, -acetoacetic ester or -malononitrile. Instead of the lower alkoxymethylene compounds, there can be used the corresponding hydroxymethylene compounds or esters thereof capable of reacting with an amino function under elimination of water, alcohols or acids. The reaction is preferably carried out in the presence of a suitable diluent with or without the application of heat or external cooling.

Reactive functionally converted carboxylic acids are, for example, esters, particularly esters of the corresponding ortho acids, such as their lower alkyl, e.g. methyl or ethyl esters; compounds of this type are, for example, orthoformic-, as well as orthoacetic lower-alkyl, e.g. methyl or ethyl esters. A functionally converted acetic acid substituted as indicated above is, for example, a malonic or cyanoacetic acid ester, such as a lower alkyl-, e.g. methyl or ethyl ester, as well as malononitrile.

The reaction is preferably carried out under heating; care has to be taken, that the reaction is not carried through to the ring closure with the formation of compounds having the ring system of the Formula I. The reaction may be performed in the absence or presence of a diluent, if necessary, in a closed vessel and/or in an atmosphere of an inert gas.

A substituent of the N'-amino group of the carboxamidine starting material is preferably an aryl group, particularly a monocyclic or bicyclic aryl, such as a phenyl group, which is cleaved off during the reaction (which is also preferably carried out while heating) together with the amino group. The reaction may be performed in the absence or presence of a diluent, if necessary, in a closed vessel and/or in an atmosphere of an inert gas.

The starting materials having the ring system of the Formula VI are, for example, obtained by reacting an aryl isocyanate or an arylisothiocyanate with an ethenyl-amine, the β-carbon atom of which carries a reactive functionally converted carboxyl group and a functionally converted carboxyl group or an acyl group and converting the resulting N-aryl-N'-ethenyl-urea or -thiourea, in which the β-carbon atom of the ethenyl group is substituted by a reactive functionally converted carboxyl group and a functionally converted carboxyl group or an acyl group, for example, by treatment with acetic acid anhydride, into the desired starting material.

The invention further includes any modification of the present process, in which an intermediate product resulting at any stage of the process is used as the starting material and any remaining steps are carried out, or the process is discontinued at any stage, or in which a starting material is formed under reaction conditions or used in the form of a derivative, such as a salt thereof.

The invention also includes any new intermediates produced during the procedure or new starting materials. Primarily one uses starting materials, which lead to the preferred compounds previously mentioned.

Depending on the reaction condition the new compounds are obtained in free form or in form of their salts, which are likewise included in the present invention; thus, e.g. basic, neutral, acid or mixed salts, possibly also in the form of hemi-, mono-, sesqui- or polyhydrates thereof, may be obtained. Salts of the new compounds can be converted in the known manner into the free compounds as well as into other salts; acid addition salts, for example, by treatment with basic reagents, such as alkaline reagents or ion exchange resins, salts with bases by reaction with acid agents, such as acids. A resulting free amino acid can form salts, especially non-toxic salts with bases, such as alkaline metal, alkaline earth metal or ammonium salts, for example, by treatment with metal hydroxides, especially alkali metal or alkaline earth metal hydroxides, e.g. sodium hydroxide, potassium hydroxide or calcium hydroxide, or with alkaline metal carbonates, e.g. sodium carbonate or potassium carbonate, with ammonia or with organic amines, or with acids. Acid addition salts are preferably therapeutically acceptable, non-toxic acid, addition salts, for example, with inoganic acids, such as hydrohalic, e.g. hydrochloric or hydrobromic acids, sulfuric, phosphoric, nitric or perchloric acid, or with organic, such as aliphatic, alicyclic, aromatic or heterocyclic carboxylic or sulfonic acids, such as formic, acetic, propionic, succinic glycollic, lactic, malic, tartaric, citric, maleic, hydroxymaleic, pyruvic, phenylacetic, benzoic, p-aminobenzoic, anthranilic, p-hydroxybenzoic, salicyclic, p-aminosalicyclic, embonic, methanesulfonic, ethanesulfonic hydroxyethanesulfonic, ethylenesulfonic, halogenobenzenesulfonic, toluenesulfonic, naphthalenesulfonic, N-cyclohexylsulfamic or sulfanilic acid, methionine, tryptophan, lysine or arginine, as well as ascorbic acid.

The aforementioned and other salts of the new compounds, for example, the picrates, may also be used for purifying the resulting free compounds by converting the free compound into a salt thereof, isolating the latter and liberating the free compound again from the salt. In view of the close relationship between the compounds in free form and in the form of their salts, whenever the free compounds or the salts are mentioned in this context, the corresponding salts and free compounds, respectively, are likewise understood provided, such is feasible.

The new compounds may be used, for example, in the form of pharmaceutical compositions, which contain them in free form or in form of their salts in admixture or conjunction with an organic or inorganic, solid or liquid pharmaceutical excipient suitable for enteral, e.g. oral or parenteral administration. Suitable excipients are substances, that do not react with the new compounds, for example, water, gelatine, sugars, e.g. lactose or glucose, starches, e.g. wheat or corn starch, stearyl alcohol, stearic acid or salts thereof, such as magnesium stearate, talcum, vegetable oils, benzyl alcohols, gums, propyleneglycols, white petroleum jelly or other known medicinal excipients. The pharmaceutical preparations may be in solid form, e.g. as tablets, dragees, capsules or suppositories, or in liquid form, for example, as solutions, suspensions or emulsions. They may be sterilised and/or may contain auxiliaries, such as preservatives, stabilizers, wetting agents or emulsifiers, solubilizers, salts for regulating the osmotic pressure or buffers. The phamaceutical preparations may also contain other therapeutically valuable substances. They are formulated by the usual methods.

The new compounds may also be used in veterinary compositions, for example, in one of the afore-mentioned forms, or as additives to animal feed stuffs, using, for example, the conventional extending and diluting agents or feed stuffs, respectively.

The following examples illustrates the invention. Temperatures are given in degrees centigrade.

EXAMPLE 1

A solution of 3 g. of diethyl N-(2-benzthiazolyl)-aminomethylene-malonate in 20 ml. of acetic anhydride is refluxed for 24 hours. Upon concentration, crystals separate out. Recrystallisation from a mixture of dimethyl formamide, ethanol and water yields 3-carbethoxy-4-oxo-4H-pyrimido[2,1-b]benzothiazole of the formula:

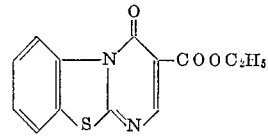

M.P. 145–146°.

The following compounds are prepared according to the previously illustrated procedure by selecting the appropriate starting materials:

3-carbetoxy-8-methyl-4-oxo-4H-pyrimido[2,1-b]-benzothiazole, M.P. 178–179°;

3-carbethoxy-8-ethoxy-4-oxo-4H-pyrimido[2,1-b]-benzothiazole, M.P. 180–181°;

3-carbethoxy-8-methoxy-4-oxo-4H-pyrimido[2,1-b]-benzothiazole, M.P. 194–195° after recrystallization from ethanol;

3-carbethoxy-6-chloro-4-oxo-4H-pyrimido[2,1-b]-benzothiazole, M.P. 110–112° after recrystallization from ethanol;

3-carbethoxy-7,8-dimethyl-4-oxo-4H-pyrimido[2,1-b]-benlothiazole, M.P. 148–149° after recrystallization from ethanol;

3-carbethoxy-8-nitro-4-oxo-4H-pyrimido[2,1-b]-benzothiazole, M.P. 248–249° after recrystallization from ethanol; and 3-carbethoxy-6-phenyl-4-oxo-4H-pyrimido[2,1-b]-benzothiazole, M.P. 177–180° after recrystallization from ethanol.

EXAMPLE 2

A suspension of 5 g. of 3-carbethoxy-4-oxo-4H-pyrimido[2,1-b]benzothiazole in 100 ml. of a 1:1 mixture of concentrated hydrochloric acid and water is heated under reflux for 4 hours and filtered. Recrystallization of the product from a mixture of dimethylformamide and ethanol affords 3-carboxy-4-oxo-4H-pyrimido[2,1-b]benzothiazole of the formula:

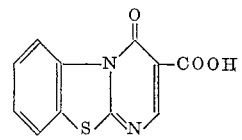

which melts at 264–266°.

In a similar way the 3-carboxy-8-methyl-4-oxo-4H-pyrimido[2,1-b]benzothiazole, M.P. 241–243°, is obtained by hydrolysis of 3-carbethoxy-8-methyl-4-oxo-4H-pyrimido [2,1-b]benzothiazole.

EXAMPLE 3

To a stirred, ice-cold mixture of 15 ml. of concentrated sulfuric acid and 15 ml. of fuming nitric acid are added 6 g. of 3-carbethoxy-4-oxo-4H-pyrimido[2,1-b]benzothiazole during 30 minutes. After being kept for one more hour at ice bath temperature, the mixture is allowed to warm up to room temperature and is then poured into ice. The precipitate is filtered off and the product is crystallized from a mixture of dimethylformamide, ethanol and water. The bright yellow crystals are further purified by digestion with boiling benzene. The insoluble part represents the pure 3-carbethoxy-7-nitro-4-oxo-4H-pyrimido [2,1-b]benzothiazole of the formula:

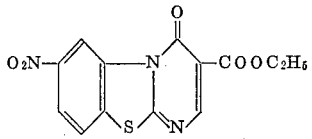

M.P. 264–265°.

EXAMPLE 4

To a stirred, ice-cold mixture of 12.5 ml. of fuming nitric acid and 12.5 ml. of concentrated sulfuric acid are added 5 g. of 3-carboxy-4-oxo-4H-pyrimido[2,1-b]benzothiazole during 30 minutes. The reaction mixture is allowed to come up to room temperature and stirred for 4 hours, then poured into crushed ice. The product separates, is filtered off, and recrystallized from a mixture of dimethylformamide, ethanol and water to yield the 3-carboxy - 7 - nitro - 4 - oxo - 4H - pyrimido[2,1-b]benzothiazole of the formula:

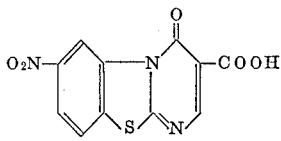

M.P. 298–300°.

In a similar way, there is obtained the 3-carboxy-8-methyl - 7 - nitro - 4 - oxo - 4H - pyrimido[2,1-b]benzothiazole, M.P. 248–249° after recrystallization from a mixture of dimethylformamide, ethanol and water, by nitrating the 3-carboxy-8-methyl-4-oxo-4H-pyrimido [2,1-b] benzothiazole.

EXAMPLE 5

A suspension of 10 g. of 3-carbethoxy-7-nitro-4-oxo-4H-pyrimido[2,1-b]benzothiazole in 300 ml. of ethanol is hydrogenated at 45° and a pressure of about 3,2 atmospheres in the presence of 0.5 g. of platinum oxide catalyst. After 10 hours, the mixture is filtered and the sparingly soluble product freed from the catalyst by extraction with dimethylformamide. The solution is diluted with water, and the precipitate is filtered off and recrystallized from a mixture of dimethylformamide, ethanol and water to yield the 7-amino-3-carbethoxy-4-oxo-4H-pyrimido[2,1-b] benzothiazole of the formula:

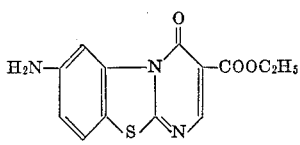

M.P. 201–202°.

EXAMPLE 6

A solution of 1.7 g. of 7-amino-3-carbethoxy-4-oxo-4H-pyrimido[2,1-b]benzothiazole in 10 ml. of pyridine is mixed with 1.4 g. of 4-acetylamino-phenyl sulfonyl chloride and allowed to stand at room temperature for 2 days, then poured into water. The precipitate is filtered off and recrystallized from a mixture of dimethylformamide, ethanol and water to afford the 3-carbethoxy-7-(4-acetylamino-phenyl - sulfonylamino - 4 - oxo - 4H - pyrimido [2,1-b]benzothiazole of the formula:

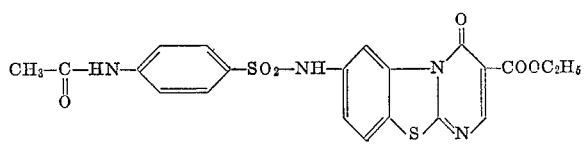

M.P. above 308°.

EXAMPLE 7

A suspension of 4.5 g. of 7-amino-3-carbethoxy-4-oxo-4H-pyrimido[2,1-b]benzothiazole in 100 ml. of toluene, containing 2.5 g. of 3-chlorophenyl isocyanate is heated under reflux for 16 hours. The mixture is filtered while hot and the precipitate is recrystallized from a mixture of dimethylformamide, ethanol and water to yield the 3-carbethoxy - 7 - [N' - (3 - chlorophenyl) - ureido] - 4 - oxo - 4H-pyrimido[2,1-b]benzothiazole of the formula:

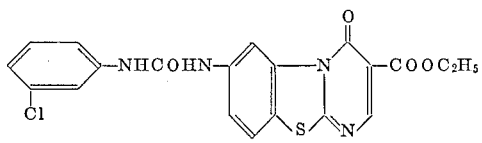

M.P. 285–286°.

EXAMPLE 8

A solution of 5 g. of 2-amino-benzothiazole and 4.1 g. of ethoxymethylene-malononitrile in 100 ml. of ethanol is heated under reflux for 3½ hours. The precipitate is collected and recrystallized from ethanol to yield 3-cyano-4-imino-4H-pyrimido[2,1-b]benzothiazole of the formula

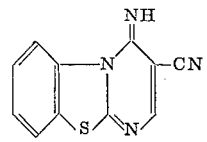

M.P. at 193–195–; the N-(2-benzthiazolyl)-aminomethylene malononitrile, formed as an intermediate is not isolated.

EXAMPLE 9

A solution of 1.6 g. of 3-cyano-4-imino-4H-pyrimido [2,1-b]benzothiazole in 100 ml. of a 1:1-mixture of concentrated hydrochloric acid and water is heated for 15 minutes, whereupon a voluminous precipitate is formed. The latter is filtered off, washed with an aqueous sodium hydrogen carbonate solution and water. Recrystallization from aqueous ethanol affords the 3-cyano-4-oxo-4H-pyrimido[2,1-b]benzothiazole of the formula:

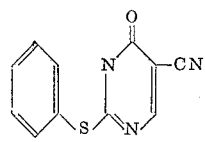

M.P. 205–208°.

EXAMPLE 10

Three grams of diethyl N-(2-benzothiazolyl)-aminomethylene-malonate are heated at 190–200° for 30 minutes. On cooling and crystallizing from ethanol, the 3-carbethoxy-4-oxo-4H-pyrimido[2,1-b]benzothiazoly, M.P. 145–146°, which is identical with the product obtained according to Example 1.

EXAMPLE 11

To 5 ml. of ice-cold fuming nitric acid is added 0.1 g. of 3-carbethoxy-8-ethoxy-4-oxo-4H-pyrimido[2,1-b] benzothiazole. The solution is allowed to come to room temperature and to stand for 3 hours, then poured onto crushed ice. The precipitate is filtered off and recrystallized from a mixture of dimethylformamide, ethanol and water to yield the 3-carbethoxy-8-ethoxy-7-nitro-4-oxo-4H-pyrimido[2,1-b]benzothiazole of the formula:

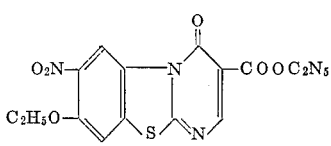

M.P. 303–304°.

EXAMPLE 12

A suspension of 5 g. of 3-carboxy-7-nitro-4-oxo-4H-pyrimido[2,1-b]benzothiazole in 300 ml. of ethanol is warmed to 40° and shaken with 0.5 g. of platinum oxide catalyst in an atmosphere of hydrogen at about 3½ atmospheres, until the theoretical amount of hydrogen is taken up. The suspension is filtered, the residue is digested with dimethylformamide to extract the product and again filtered to remove the catalyst. The product is recovered from the dimethylformamide and ethanol solutions and recrystallized from a mixture of dimethylformamide and ethanol to yield the 7-amino-3-carboxy-4-oxo-4H-pyrimido[2,1-b]benzothiazole of the formula:

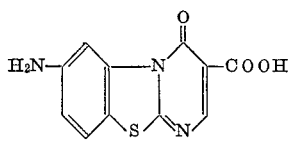

M.P. 307–308°.

EXAMPLE 13

A solution of 3 g. of 7-amino-3-carbethoxy-4-oxo-4H-pyrimido[2,1-b]benzothiazole in 10 ml. of pyridine, containing 2.5 g. of 4-nitro-phenyl-sulphonyl chloride is allowed to stand at room temperature for 2 days, and is then poured into water. The precipitate is filtered off and recrystallized from a mixture of dimethylformamide, ethanol and water to yield the 3-carbethoxy-7-(4-nitro-phenyl-sulphonylamino)-4-oxo-4H-pyrimido[2,1-b]benzothiazole of the formula:

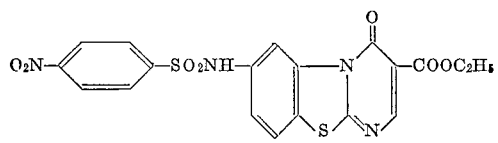

M.P. 267–269°.

EXAMPLE 14

A suspension of 1.5 g. of 7-amino-3-carbethoxy-4-oxo-4H-pyrimido[2,1-b]benzothiazole in 25 ml. of ethanol, containing 0.8 g. of 4-fluoro-benzaldehyde and a drop of piperidine is heated under reflux for 16 hours. The mixture is cooled and filtered, and the filter residue is recrystallized from a mixture of dimethylformamide, ethanol and water to yield the 3-carbethoxy-7-(4-fluoro-benzylidene - amino)-4-oxo-4H-pyrimido[2,1-b]benzothiazole of the formula:

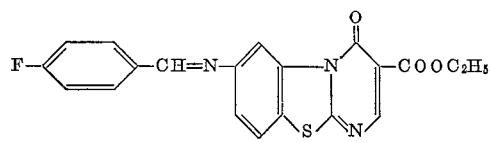

M.P. 190–191°.

EXAMPLE 15

A suspension of 1.5 g. of 3-carbethoxy-4-oxo-4H-pyrimido[2,1-b]benzothiazole in 25 ml. of ethanol, containing 0.5 g. of hydrazine hydrate is heated under reflux for 30 minutes. The precipitate is filtered off and recrystallized from a mixture of dimethylformamide, ethanol and water to yield the 4-oxo-4H-pyrimido[2,1-d]benzothiazole-3-carboxylic acid hydrazide of the formula:

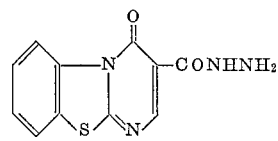

which melts at 237–238°.

EXAMPLE 16

While stirring, a solution of 5.18 g. of ethoxymethylene-malononitrile in 50 ml. of tetrahydrofurane is treated dropwise and at 0° with a solution of 5.28 g. of 2-amino-benzoxazole in 50 ml. of tetrahydrofurane. The reaction mixture is brought to room temperature and stirred for an additional 12 hours. After evaporating a crystalline material is obtained, which, recrystallized from isopropanol, yields the 3-cyano-4-imino-4H-pyrimido[2,1-b]benzoxazole of the formula:

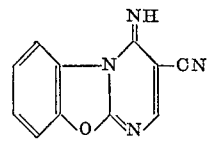

M.P. 250°.

EXAMPLE 17

A mixture of 17.1 g. of diethyl N-[4-(4-chlorophenyl-oxy)-2-benzthiazolyl]-aminomethylene-malonate and 100 ml. of acetic acid anhydride is heated under reflux for 24 hours, then concentrated and cooled. The precipitate is filtered off and washed with ethanol to afford the 3-carbethoxy - 6 - (4 - chlorophenyloxy)-4-oxo - 4H - pyrimido [2,1-b]benzothiazole of the formula:

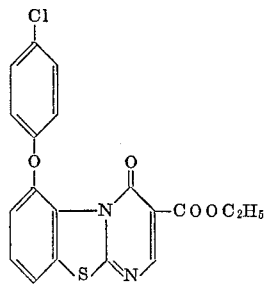

which, after recrystallisation from a mixture of benzene and hexane, melts at 142–143°.

EXAMPLE 18

A mixture of 8.5 g. of diethyl N-(2-naphtho[1,2-d]-thiazolyl)-aminomethylene-malonate and 5 ml. of acetic acid anhydride is heated under reflux for 34 hours, then concentrated and cooled. The precipitate is filtered off and washed with ethanol to yield the 10-carbethoxy-11-oxo - 11H - naphtho[1',2':4,5]thiazolo[3,2-a]pyrimidine of the formula:

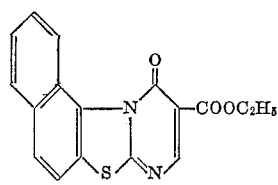

which, after recrystallization from ethanol, melts at 157–159°.

EXAMPLE 19

A mixture of 29.3 g. of diethyl N-(2-naphtho[2,1-d] thiazolyl)-aminomethylene-malonate and 300 ml. of acetic acid anhydride is heated under reflux for 24 hours, then concentrated and cooled. The precipitate is filtered off, washed with ethanol and crystallized from benzene to afford the 9 - carbethoxy-8-oxo-8H-naphtho[2',1':4.5] thiazolo[3,2-a]pyrimidine of the formula:

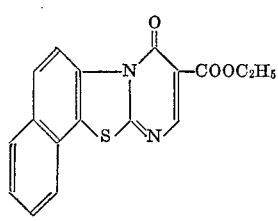

melting at 185–186°.

EXAMPLE 20

A mixture of 6.5 g. of diethyl N-(5-bromo-2-naphtho[1,2-d]thiazolyl) - aminomethylene - malonate and 70 ml. of acetic acid anhydride is refluxed during 20 hours. Upon concentrating the reaction mixture, a crystalline material precipitates, which after recrystallization from p-dioxan yields the 5-bromo-10-carbethoxy-11-oxo-11H-naphtho[1',2':4,5]thiazolo[3,2 - a]pyrimidine of the formula:

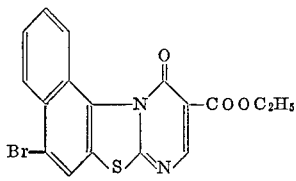

which melts at 210–211°.

EXAMPLE 21

A mixture of 4.88 g. of 5-carbethoxy-2-mercapto-6-oxo-1-phenyl-1,6-dihydro-pyrimidine in 50 ml. of dry chloroform and 4 g. of bromine in 100 ml. of dry chloroform is heated under reflux for 6 hours. The solvent is then removed under reduced pressure, the residue is taken up in water and the aqueous mixture is basified with a 2 N aqueous sodium hydroxide solution. The resulting solid is filtered off, washed with water, dried and crystallised from a mixture of dimethylformamide, ethanol and water to yield the 3-carbethoxy-4-oxo-4H-pyrimido[2,1-b]benzthiazole of the formula:

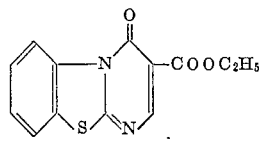

M.P. 145–146°.

The starting material is prepared as follows:

A mixture of 13.5 g. of phenyl-isothiocyanate and 18.7 g. of diethylamino-methylene-malonate is heated for 12 hours at 160–170°, then cooled and triturated with benzene. The solid material is filtered off and crystallized from benzene to yield the N-phenyl-N'-(2,2-dicarbethoxyvinyl)-thiourea, which is used without further purification.

A mixture of 17.1 g. of N-phenyl-N'-(2,2-dicarbethoxyvinyl)-thiourea and 100 ml. of acetic acid anhydride is heated under reflux for 24 hours. The solution is concentrated and cooled, the solid material is collected, washed with a small amount of ethanol and crystallized from ethanol to afford 5-carbethoxy-2-mercapto-6-oxo-1-phenyl-1,6-dihydropyrimidine, which is used without further purification.

EXAMPLE 22

Tablets containing 0.025 g. of the active compound are prepared as follows:

| Ingredients (For 1000 tablets): | Grams |
|---|---|
| 3-carboxy - 7 - nitro - 4 - oxo-4H-pyrimido [2,1-b]benzthiazole | 25 |
| Corn starch | 155 |
| Talc | 14 |
| Magnesium stearate | 6 |
| Water, distilled, o.s. | |

The 3 - carboxy - 7 - nitro-4-oxo-4H-pyrimido[2,1-b]benzthiazole is mixed intimately with 125 g. of corn starch. A paste prepared from 30 g. of corn starch and 100 g. of distilled water is added to the above mixture. The mass is well kneaded, granulated and dried at 45°. A mixture of the talc and magnesium stearate is added to the above granules and mixed well; the granulate is then compressed into tablets of 0.2 g. weight.

Tablets containing 0.05 g. of the active compound are obtained by compressing the above granulate into tablets of 0.4 g. weight.

EXAMPLE 23

Tablets containing 0.05 g. of the active compound are produced as follows:

| Ingredients (for 5000 tablets): | Grams |
|---|---|
| 10-carbethoxy-11-oxo-11H-naphtho [1',2':4,5] thiazolo[3,2-a]pyrimidine | 100 |
| Corn starch | 800 |
| Talc | 70 |
| Magnesium stearate | 30 |
| Distilled water, q.s. | |

Tablets are prepared according to the method described in Example 22.

Starting materials used in the above procedure may be prepared as follows:

EXAMPLE A

A mixture of 5 g. of 2-amino-benzothiazole and 10 ml. of diethyl ethoxymethylene-malonate in 70 ml. of ethanol is heated under reflux for 20 hours. Upon concentration and cooling, a precipitate is formed, which is recrystallized from ethanol to afford the diethyl N-(2-benzothiazolyl)-amino-methylene-malonate of the formula:

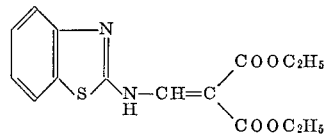

melting at 106–107°.

In a similar way the following compounds may be prepared by selecting the appropriate starting materials;

diethyl N - (6-methyl-2-benzthiazolyl) - aminomethylene-malonate, M.P., 142–143° after recrystallization from ethanol;

diethyl N - (6-ethoxy-2-benzthiazolyl) - aminomethylene-molante, M.P. 138–139° after recrystallization from ethanol;

diethyl N-(6-methoxy-2-benzthiazolyl) - aminomethylene-malonate, M.P. 148–149° after recrystallization from ethanol;

diethyl N - (4-chloro-2-benzthiazolyl) - aminomethylene-malonate, M.P. 116–117° after recrystallization from ethanol;

diethyl N - (5,6-dimethyl-2-benzthiazolyl)-aminomethylene-malonate, M.P. 135–136 after recrystallization from ethanol; and diethyl N-(6-nitro-2-benzthiazolyl) - aminoethylene-malonate, M.P. 211–212°.

EXAMPLE B

A suspension of 6.9 g. of N-(2-biphenyl)-thiourea in 150 ml. of dry chloroform is heated under stirring with a solution of 4.8 g. of bromine in 20 ml. of chloroform, then refluxed for 20 minutes with the exclusion of moisture. After cooling, the reaction mixture is washed with an aqueous sodium bisulphate solution and then with aqueous ammonium hydroxide, the chloroform layer is dried and evaporated, and the residue is recrystallized from ethanol; the 2-amino-4-phenyl-benzthiazole melts at 205–206°.

A solution of 5.8 g. of 2-amino-4-phenyl-benzthiazole and 12 ml. of diethyl ethoxymethylenemalonate in 150 ml. of ethanol is heated under reflux for 24 hours. The solution is then concentrated to 25 ml. and cooled, whereupon the product crystallizes out. It is recrystallized from ethanol to afford the diethyl N-(4-phenyl-2-benzthiazolyl)-aminomethylene malonate of the formula:

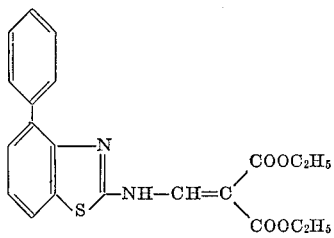

which melts at 101–102°.

EXAMPLE C

A solution of 26 g. of 2-(4-chlorophenyloxy)-phenylisothiocyanate in 100 ml. of ethanol is treated with 50 ml. of concentrated aqueous ammonia and allowed to stand with occasional shaking for 16 hours. The ethanol is removed and the residue is crystallized from a mixture of benzene and n-hexane to give the 2-(4-chlorophenyloxy)-phenyl-thiourea, M.P. 141–142°. Upon treatment with bromine as described in Example B, it is converted into the 2-amino-4-(4-chlorophenyloxy)-benzthiazole, M.P. 172–173°.

A solution of 16.8 g. of the above product in 150 ml. of ethanol is treated with 12 g. of diethyl ethoxymethylene-malonate; the reaction product is refluxed for 20 hours, concentrated and cooled, and the resulting diethyl N-[4-(4-chlorophenyloxy)-2-benzthiazolyl]-aminomethylene-malonate of the formula:

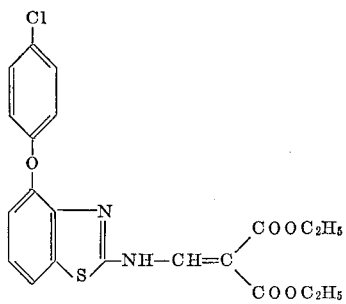

is recrystallized from ethanol, M.P. 102–103°.

EXAMPLE D

A solution of 28.5 g. of 2-amino-naphtho[1,2-d]thiazole in 450 ml. of ethanol is treated with 29 g. of diethyl ethoxymethylene-malonate and the mixture is heated for 24 hours under reflux. The solution is concentrated, then cooled and the crystalline material recrystallized from ethyl acetate; the resulting diethyl N-(naphtho[1,2-d]-aminomethylene-malonate of the formula:

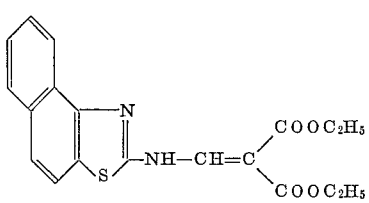

melts at 160–161°.

In a similar way, the N-(5-bromo-2-naphtho[1,2-d]thiazolyl)-aminomethylene-malonate is obtained, which after recrystallization from ethyl acetate, melts at 164–165°.

EXAMPLE E

A mixture of 20 g. of 2-amino-naphtho[2,1-d]thiazole and 20 g. of diethyl ethoxymethylene-malonate in a mixture of 80 ml. of dimethyl formamide and 30 ml. of methanol is heated under reflux for 2 hours, the solution is concentrated and cooled to afford the diethyl N-(2-naphtho[2,1-d]thiazolyl)-aminomethylene - malonate of the formula:

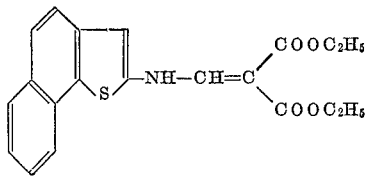

which, after crystallization from ethanol, melts at 114–116°.

We claim:
1. A member selected from the group consisting of a compound having one of the formulae:

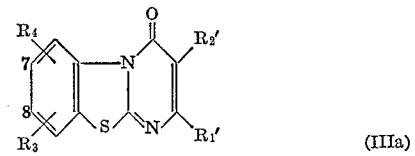

(IIIa)

and

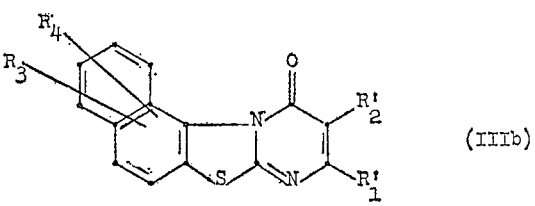

(IIIb)

in which $R_1'$ is a member selected from the group consisting of hydrogen and lower alkyl, $R_2'$ is a member selected from the group consisting of free carboxyl, carbo-lower alkoxy, lower alkanoyl and cyano, and each of the groups $R_3$ and $R_4$ stands for a member selected from the group consisting of hydrogen, lower alkyl, lower alkenyl, lower alkoxy, phenyloxy, phenyl-lower alkoxy, lower alkylmercapto, trifluoromethyl, nitro, amino, lower alkylamino, di-lower alkyl-amino, lower alkanoyl-amino, carbamoylamino, thiocarbamoylamino, N-phenyl-carbamoylamino, N-lower alkylcarbamoylamino, sulfonylamino, phenyl-sulfonylamino, carboxy, carbo-lower alkoxy, sulfamoyl, pheny, phenyl-lower alkyl, halogen, and, when taken together, lower alkylenedioxy, phenyl in the above substituents being unsubstituted or substituted by a member selected from the group consisting of lower alkyl, lower alkoxy, nitro, halogeno or lower alkanoylamino, and therapeutically acceptable salts of such compounds.

2. A compound as claimed in claim 1 and being a member selected from the group consisting of a compound having one of the formulae:

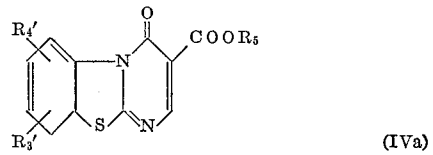

(IVa)

and

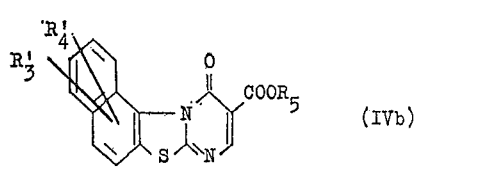

(IVb)

in which each of $R_3'$ and $R_4'$ is a member selected from the group consisting of a hydrogen atom, a lower alkyl, lower alkoxy, nitro, trifluoromethy, amino, lower alkylamino, di-lower alkyl-amino, lower alkanoyl-amino, phenylsulfonylamino, carbamoylamino, N'-phenylcarbamoylamino or N'-lower alkyl-carbamoylamino group and a halogen atom, and $R_5$ stands for a member selectfrom the group consisting of hydrogen and lower alkyl, and therapeutically acceptable salts thereof.

3. A compound as claimed in claim 1 and being a member selected from the group consisting of 3-carboxy-7-nitro-4-oxo-4H-pyrimido[2,1-b]benzthiazole and therapeutically acceptable salts thereof.

4. A compound as claimed in claim 1 and being a member selected from the group consisting of lower alkyl esters of 3-carboxy-7-nitro-4-oxo-4H-pyrimido[2,1-b]benzthiazole and therapeutically acceptable salts thereof.

5. A compound as claimed in claim 1 and being a member selected from the group consisting of 7-N-(4-acetylaminophenylsulfonyl)-amino-3-carbethoxy-4-oxo-4H-pyrimido[2,1-b]benzthiazole, and therapeutically acceptable salts thereof.

6. A compound as claimed in claim 1 and being a member selected from the group consisting of 3-carbethoxy-7-N-(3-chloro-phenylcarbamoyl)-amino-4-oxo-4H-pyrimido[2,1-b]benzthiazole and therapeutically acceptable salts thereof.

7. A compound as claimed in claim 1 and being a member selected from the group consisting of 8-ethoxy-3-carbethoxy-4-oxo-4H-pyrimido[2,1-b]benzthiazole and therapeutically acceptable salts thereof.

8. A compound as claimed in claim 1 and being a member selected from the group consisting of 3-carboxy-8-methyl-4-oxo-4H-pyrimido[2,1-b]benzthiazole and therapeutically acceptable salts thereof.

9. A compound as claimed in claim 1 and being a member selected from the group consisting of 10-carbethoxy-11-oxo-11H-naphtho[1',2':4,5]thiazolo[3,2-a]pyrimidine and therapeutically acceptable salts thereof.

References Cited

Antaki, et al., J.C.S. 1951:551–5 (1951).
Gompper, et al., Ber. 95:2871–80 (1962).

HENRY R. JILES, Primary Examiner

C. M. SHURKO, Assistant Examiner

U.S. Cl. X.R.

260—251, 256.4, 256.5, 309.2; 424—251